United States Patent
Isobe et al.

(10) Patent No.: US 9,451,528 B2
(45) Date of Patent: Sep. 20, 2016

(54) RADIO COMMUNICATION TERMINAL, COMMUNICATION CONTROL APPARATUS, AND COMMUNICATION CONTROL METHOD

(71) Applicant: NTT DOCOMO, INC., Tokyo (JP)

(72) Inventors: Shin-ichi Isobe, Tokyo (JP); Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/394,275

(22) PCT Filed: Apr. 9, 2013

(86) PCT No.: PCT/JP2013/060673
§ 371 (c)(1),
(2) Date: Oct. 14, 2014

(87) PCT Pub. No.: WO2013/157437
PCT Pub. Date: Oct. 24, 2013

(65) Prior Publication Data
US 2015/0119049 A1    Apr. 30, 2015

(30) Foreign Application Priority Data

Apr. 18, 2012   (JP) ................................ 2012-095080

(51) Int. Cl.
*H04W 40/00* (2009.01)
*H04W 40/24* (2009.01)
(Continued)

(52) U.S. Cl.
CPC ........... *H04W 40/24* (2013.01); *H04W 76/023* (2013.01); *H04W 48/06* (2013.01)

(58) Field of Classification Search
CPC .................................................. H04W 88/06

USPC ........................................................ 455/445
See application file for complete search history.

(56) References Cited

U.S. PATENT DOCUMENTS

| 2003/0092452 | A1* | 5/2003 | Youngs et al. ................ 455/461 |
| 2004/0127214 | A1* | 7/2004 | Reddy et al. .............. 455/426.2 |

(Continued)

FOREIGN PATENT DOCUMENTS

| JP | 7-327269 A | 12/1995 |
| JP | 8-307934 A | 11/1996 |

(Continued)

OTHER PUBLICATIONS

International Search Report for corresponding International Application No. PCT/JP2013/060673, mailed Jun. 11, 2013 (2 pages).

(Continued)

*Primary Examiner* — Santiago Garcia
(74) *Attorney, Agent, or Firm* — Osha Liang LLP (57) ABSTRACT

Provided are a radio communication terminal, a communication control apparatus, and a communication control method capable of enhancing the possibility of providing a communication application through inter-terminal direct communication (D2D communication) even in a case where a call request cannot be accepted due to congestion on the network side. In a terminal 400A, a call restriction reception unit 420 receives a call restriction containing configuration information on a communication environment necessary for direct communication. During restriction of initiation of communication to the radio access network, a radio communication unit 440 executes direct communication with another radio communication terminal based on the configuration information if a direct communication determination unit 430 determines that a communication application is executable through direct communication.

4 Claims, 4 Drawing Sheets

(51) Int. Cl.
*H04W 76/02* (2009.01)
*H04W 48/06* (2009.01)

(56) References Cited

U.S. PATENT DOCUMENTS

| | | | |
|---|---|---|---|
| 2006/0035587 A1* | 2/2006 | Shimizu | 455/3.06 |
| 2007/0274280 A1* | 11/2007 | Haas et al. | 370/348 |
| 2008/0085732 A1* | 4/2008 | Mizuide et al. | 455/519 |
| 2008/0318612 A1* | 12/2008 | Axnas et al. | 455/522 |
| 2011/0045822 A1* | 2/2011 | Hidaka | 455/424 |
| 2012/0201158 A1* | 8/2012 | Geirhofer et al. | 370/252 |
| 2012/0320886 A1* | 12/2012 | Anders et al. | 370/338 |
| 2013/0281011 A1 | 10/2013 | Noguchi et al. | |

FOREIGN PATENT DOCUMENTS

| | | |
|---|---|---|
| JP | 2006-333449 A | 12/2006 |
| JP | 2006-340294 A | 12/2006 |
| JP | 2007-329853 A | 12/2007 |
| WO | 2008/149778 A1 | 12/2008 |

OTHER PUBLICATIONS

Written Opinion for corresponding International Application No. PCT/JP2013/060673, mailed Jun. 11, 2013 (3 pages).

B. Bertenyi; "Key drivers for LTE success: Services Evolution;" 3GPP Seminar, LTE Asia; Sep. 6, 2011 (15 pages).

K. Doppler et al.; "Mode selection for Device-to-Device Communication underlaying an LTE-Advanced Network;" 2010 IEEE; Finland; (6 pages).

K. Doppler et al.; "Device-to-Device communications; functional prospects for LTE-Advanced networks;" IEEE; Finland; 2009 (6 pages).

Office Action in counterpart Japanese Patent Application No. 2012-095080, dated Nov. 10, 2015 (6 pages).

Office Action issued in corresponding Japanese Application No. 2012-095080, mailed Apr. 5, 2016 (10 pages).

* cited by examiner

RADIO COMMUNICATION TERMINAL, COMMUNICATION CONTROL APPARATUS, AND COMMUNICATION CONTROL METHOD

TECHNICAL FIELD

The present invention relates to a radio communication terminal capable of providing a communication application by involving a radio access network and providing a communication application by performing direct communication with another radio communication terminal without involving the radio access network, as well as a communication control apparatus and a communication control method.

BACKGROUND ART

A radio access network such as Long Term Evolution (LTE) standardized by 3rd Generation Partnership Project (3GPP) defines access restriction in which, when a particular radio base station is congested due to a temporary increase in communication traffic or the like, a radio communication terminal (a mobile station) restricts initiation of communication based on broadcast information transmitted from the radio base station.

The following is also defined: in a case where a radio base station or a network apparatus (such as a switch) cannot accept a call request from a radio communication terminal due to congestion, the network apparatus responds to the radio communication terminal with a Service reject to reject the call request.

Further, in recent years, so-called Device-to-Device (D2D) communication is being discussed by 3GPP. In D2D communication, a radio communication terminal performs direct communication with another communication terminal without involving a radio base station (for example, Non-patent Document 1). Such D2D communication not involving a radio base station or a network apparatus can enhance the possibility that a radio communication terminal can originate a call even during congestion like the one described above.

PRIOR ART DOCUMENT

Non-Patent Document

Non-patent document 1: "Key drivers for LTE success: Services Evolution," September, 2011, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF THE INVENTION

However, there has been a problem in which even when a radio communication terminal tries to execute D2D communication during access restriction or upon receipt of a Service reject, the radio communication terminal cannot know a communication environment necessary for the D2D communication or a communication application to be provided by use of the D2D communication, and therefore cannot effectively utilize the D2D communication.

Thus, the present invention has been made in view of such circumstances, and has an objective of providing a radio communication terminal, a communication control apparatus, and a communication control method capable of enhancing the possibility of providing a communication application through inter-terminal direct communication (D2D communication) even in a case where a call request cannot be accepted due to congestion on the network side.

A first feature of the present invention is summarized as a radio communication terminal capable of providing a communication application via a radio access network and providing a communication application through direct communication with another radio communication terminal without involving the radio access network, the radio communication terminal including: a call restriction reception unit configured to receive a call restriction from the radio access network, the call restriction restricting initiation of communication to the radio access network; a direct communication determination unit configured to determine whether or not a communication application to be executed in the radio communication terminal is executable through direct communication with another radio communication terminal without involving the radio access network; and a radio communication unit configured to execute direct communication based on a result of the determination by the direct communication determination unit, wherein the call restriction reception unit receives a call restriction containing configuration information on a communication environment necessary for direct communication, and during restriction of initiation of communication to the radio access network, the radio communication unit executes direct communication with the other radio communication terminal based on the configuration information when the direct communication determination unit determines that the communication application is executable through direct communication.

A second feature of the present invention is summarized as a communication control apparatus which controls a radio communication terminal capable of providing a communication application via a radio access network and providing a communication application through direct communication with another radio communication terminal without involving the radio access network, the communication control apparatus including a call restriction transmission unit configured to send the radio communication terminal and the other radio communication terminal a call restriction restricting initiation of communication to the radio access network and containing permission information indicating whether direct communication is permitted or not and configuration information on a communication environment necessary for direct communication, wherein the call restriction transmission unit sends the permission information permitting direct communication between adjacent multiple areas.

A third feature of the present invention is summarized as A communication control method performed by a radio communication terminal capable of providing a communication application via a radio access network and providing a communication application through direct communication with another radio communication terminal without involving the radio access network, the method including the steps of: receiving a call restriction from the radio access network, the call restriction restricting initiation of communication to the radio access network; determining whether or not a communication application to be executed in the radio communication terminal is executable through direct communication with another radio communication terminal without involving the radio access network; and executing direct communication based on a result of the determination made in the determining step, wherein in the receiving step, the call restriction received contains configuration information on a communication environment necessary for direct communication, and in the step of executing direct communication, during restriction of initiation of communication to the radio access network, the direct communication with the other radio communication terminal is executed based on the configuration information if the determining step determines that the communication application is executable through direct communication.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Radio Communication System

Figure 1:
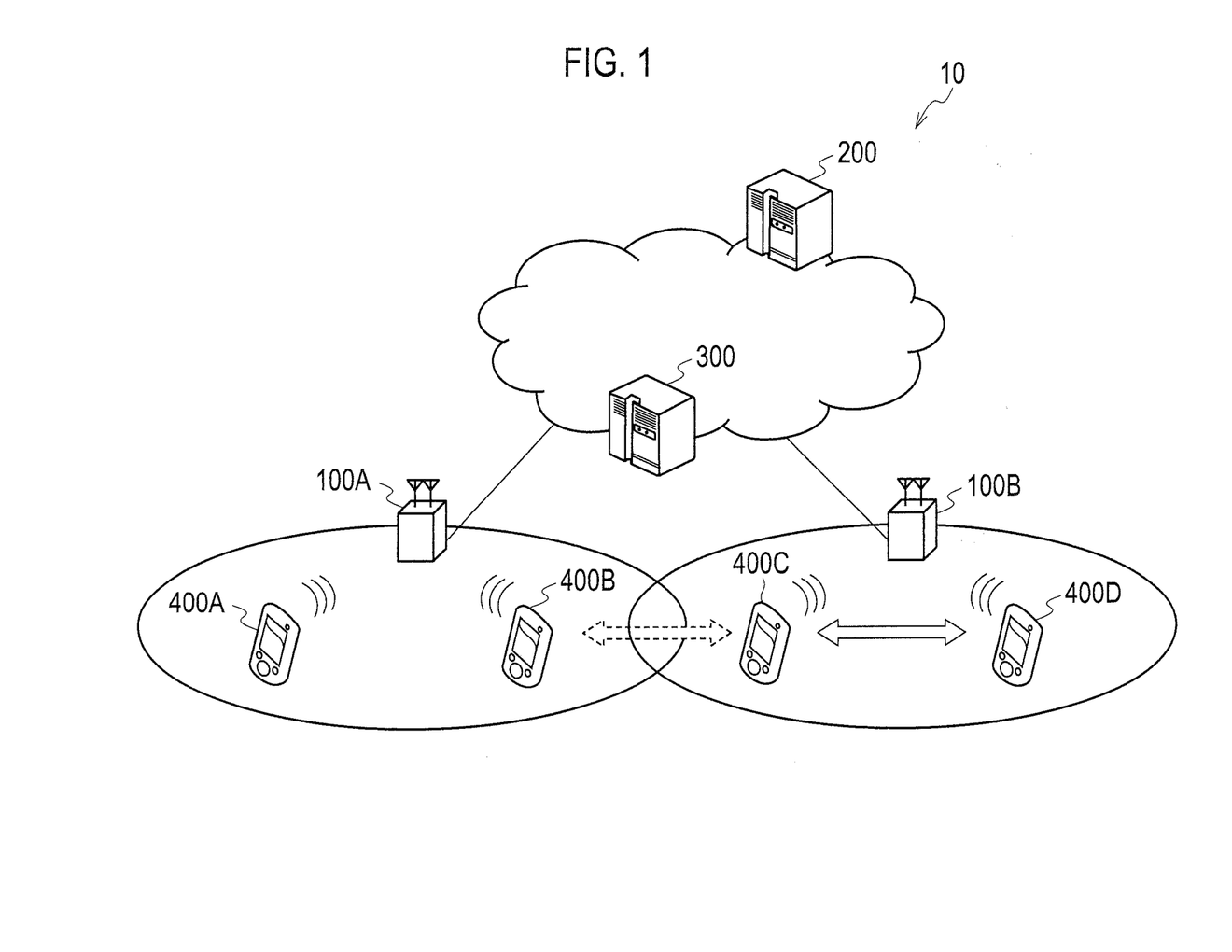
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes radio base stations 100A, 100B, an operation system 200, a switch 300, and multiple radio communication terminals 400A, 400B, 400C, 400D (referred to as terminals 400A, 400B, 400C, 400D hereinbelow).

The radio base station 100A and the radio base station 100B perform operation conforming to a radio access technique (RAT) standardized by 3GPP, e.g., Long Term Evolution (LTE).

The operation system 200 monitors and controls a radio access network configured by the radio base stations 100A, 100B, the switch 300, and the like. The operation system 200 also commands the radio base station 100A, 100B to restrict their access, when the radio access network is congested. In this embodiment, the operation system 200 configures a communication control apparatus. The operation system 200 may command the switch 300 to perform restriction processing, when a core network connected to the radio access network is congested.

Note that, in this embodiment, a similar command may be given to apparatuses constituting the radio access network or the core network in an event of not only the congestion, but also a disaster and a case for which such command is deemed necessary to operate the network. In this case, the terminals 400A, 400B may be notified of configuration information on a communication environment for direct communication based on CBS/ETWS/PWS specifications, and at the same time of notification of various messages based on the above specifications, they are notified of information indicating that direct communication is allowed.

The switch 300 processes communication calls originated by the terminals 400A, 400B (such as a voice communication call by circuit switch (CS) or a voice communication call by packet switch (PS)). Further, when a call request from a terminal cannot be accepted due to congestion of the switch 300, the switch 300 (e.g., SGSN (Serving GPRS Support Node), MSC (Mobile Services Switching Center), MME (Mobile Management Entity), or eNodeB) responds to the terminal with a Service reject to reject the call request.

The terminal 400A to the terminal 400D are each a User Equipment (UE) configured to perform radio communication conforming to a radio access technique such as LTE.

The terminals 400A to 400D can communicate with another terminal via the radio base station 100A, 100B and can directly communicate with another terminal without involving the radio base station 100A. Specifically, the terminals 400A to 400D can provide a communication application via the radio access network and provide a communication application through direct communication with another terminal without involving the radio access network.

(2) Functional Block Configuration of the Radio Communication System

Figure 2:
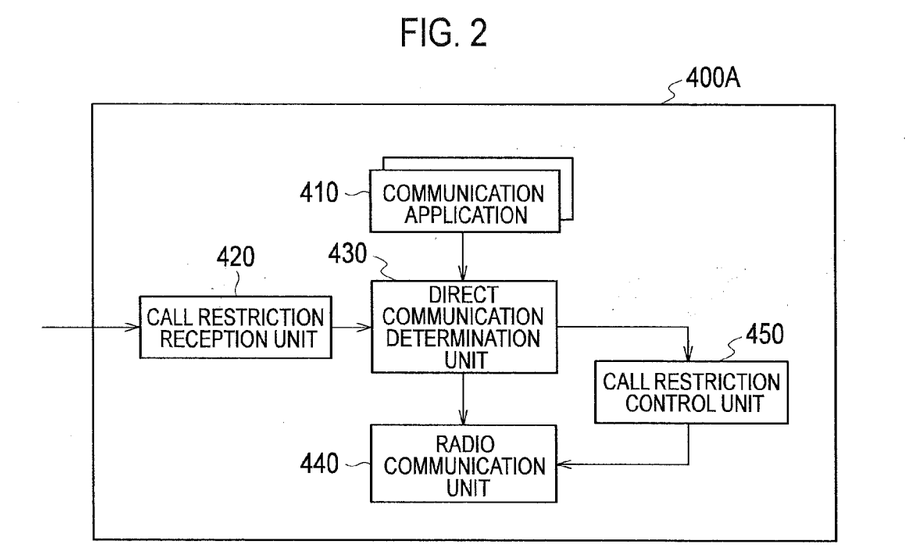
FIG. 2 is a functional block configuration diagram of a terminal 400A according to the embodiment of the present invention.
Figure 3:
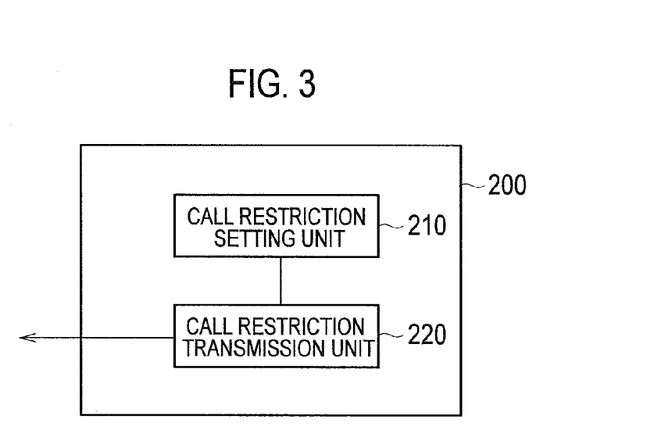
FIG. 3 is a functional block configuration diagram of an operation system 200 according to the embodiment of the present invention.

Next, a functional block configuration of the radio communication system 10 is described. Specifically, functional block configurations of the terminal 400A and the operation system 200 are described. FIG. 2 is a functional block configuration diagram of the terminal 400A. FIG. 3 is a functional block configuration diagram of the operation system 200.

(2.1) Terminal 400A

As shown in FIG. 2, the terminal 400A includes communication applications 410, a call restriction reception unit 420, a direct communication determination unit 430, a radio communication unit 440, and a call restriction control unit 450. The terminals 400B to 400D have similar functional block configurations to that of the terminal 400A.

The communication applications 410 are each a communication application executable in the terminal 400A, and is, for example, a voice communication application, messaging service, web browsing, and the like.

The call restriction reception unit 420 receives a call restriction from a radio access network, the call restriction restricting initiation of communication to the radio access network. Specifically, the call restriction reception unit 420 receives the call restriction from the radio base station 100A (100B). The call restriction includes the above-described access restriction, Service reject, and CBC/ETWS/PWS message. The call restriction contains configuration information on a communication environment necessary for direct communication. Further, the call restriction may contain permission information indicating whether direct communication is permitted or not. The configuration information contains a frequency band allowed for direct communication, the radio field intensity of radio signals, originating timing for terminals (timing of executing direct communication), and an identifier of a counterpart (terminating) terminal (such as a telephone number, a terminal identifier, and a subscriber identifier).

The call restriction reception unit 420 receives the call restriction containing the configuration information or the call restriction containing the permission information. Note that the call restriction reception unit 420 may be notified of information on an application allowing direct communication through the configuration information or the permission information.

The direct communication determination unit 430 determines whether the communication application to be executed in the terminal 400A can be executed through direct communication with another radio communication terminal without involving the radio access network or not. The direct communication determination unit 430 determines whether the communication application 410 can be executed through direct communication or not based on the permission information on direct communication received by the call restriction reception unit 420.

Specifically, if direct communication with another terminal is permitted by the permission information, the direct communication determination unit 430 determines whether or not the communication application 410 can be executed through direct communication. For example, if the communication application is a voice communication application or messaging service, the terminal 400A does not need to access another network (such as the Internet) via the radio access network. Thus, the direct communication determination unit 430 determines that direct communication is possible. On the other hand, if the communication application is web browsing or the like, the terminal 400A needs to access another network (such as the Internet). Thus, the direct communication determination unit 430 determines that direct communication is not possible. Alternatively, if information on an application allowed to be executed by direct communication is received through the configuration information or the permission information, a communication application allowed may be determined based on this information.

The radio communication unit 440 executes radio communication with the radio base station 100A (100B) and radio communication (direct communication) with the terminal 400B (400C, 400D). In particular, the radio communication unit 440 executes direct communication based on a result of the determination by the direct communication determination unit 430. Specifically, during restriction of initiation of communication to the radio access network, if the direct communication determination unit 430 determines that the communication application 410 can be executed through direct communication, the radio communication unit 440 executes direct communication with another terminal based on the configuration information on direct communication.

The call restriction control unit 450 determines whether the communication application 410 is targeted by the call restriction or not when the direct communication determination unit 430 determines that the communication application 410 cannot be executed through direct communication. Then, if the communication application 410 is not targeted by the call restriction, the call restriction control unit 450 permits execution of the communication application 410 via the radio access network. Examples of the communication application 410 which is not targeted by call restriction include an emergency call.

(2.2) Operation System 200

As shown in FIG. 3, the operation system 200 includes a call restriction setting unit 210 and a call restriction transmission unit 220.

The call restriction setting unit 210 sets a call restriction according to the status of the radio access network or the status of the core network. Specifically, the call restriction setting unit 210 sets an access restriction or Service Reject response according to the congestion status of the radio access network or the congestion status of the core network. Note that the call restriction setting unit 210 can set the access restriction or the Service Reject response not only according to the congestion status of the radio access network, but also according to failure, planned suspension, or the like of the radio access network or the core network. Further, the access restriction or the Service Reject response may be inputted manually by an operator, or may be automatically set according to the amount of traffic or the like.

The call restriction transmission unit 220 sends the call restriction (more specifically the access restriction) set by the call restriction setting unit 210 to the terminals 400A to 400D via the radio base stations 100A, 100B. The call restriction transmission unit 220 can send permission information permitting direct communication to be performed between adjacent multiple areas, e.g., a cell formed by the radio base station 100A and a cell formed by the radio base station 100B. Note that the call restriction transmission unit 220 may use a sector or a tracking area as a unit of the adjacent area.

In this case, based on information on the above areas designated, the radio base stations 100A, 100B may notify the terminals 400A to 400D of call enabled area information. The call enabled area information is, for example, a communicable radius distance, a call enabling radio intensity, information on a camped cell on which a counterpart terminal with which the terminal can communicate, and the like. The call enabled area information may be set by the operation system 200, the radio base stations 100A, 100B, or other apparatus.

(3) Operation of the Radio Communication System

Next, operation of the above radio communication system 10 is described. Specifically, a description is given of operation performed between terminals when call restriction (access restriction or Service reject response) for the radio access network is active.

(3.1) Operation During Access Restriction

Figure 4:
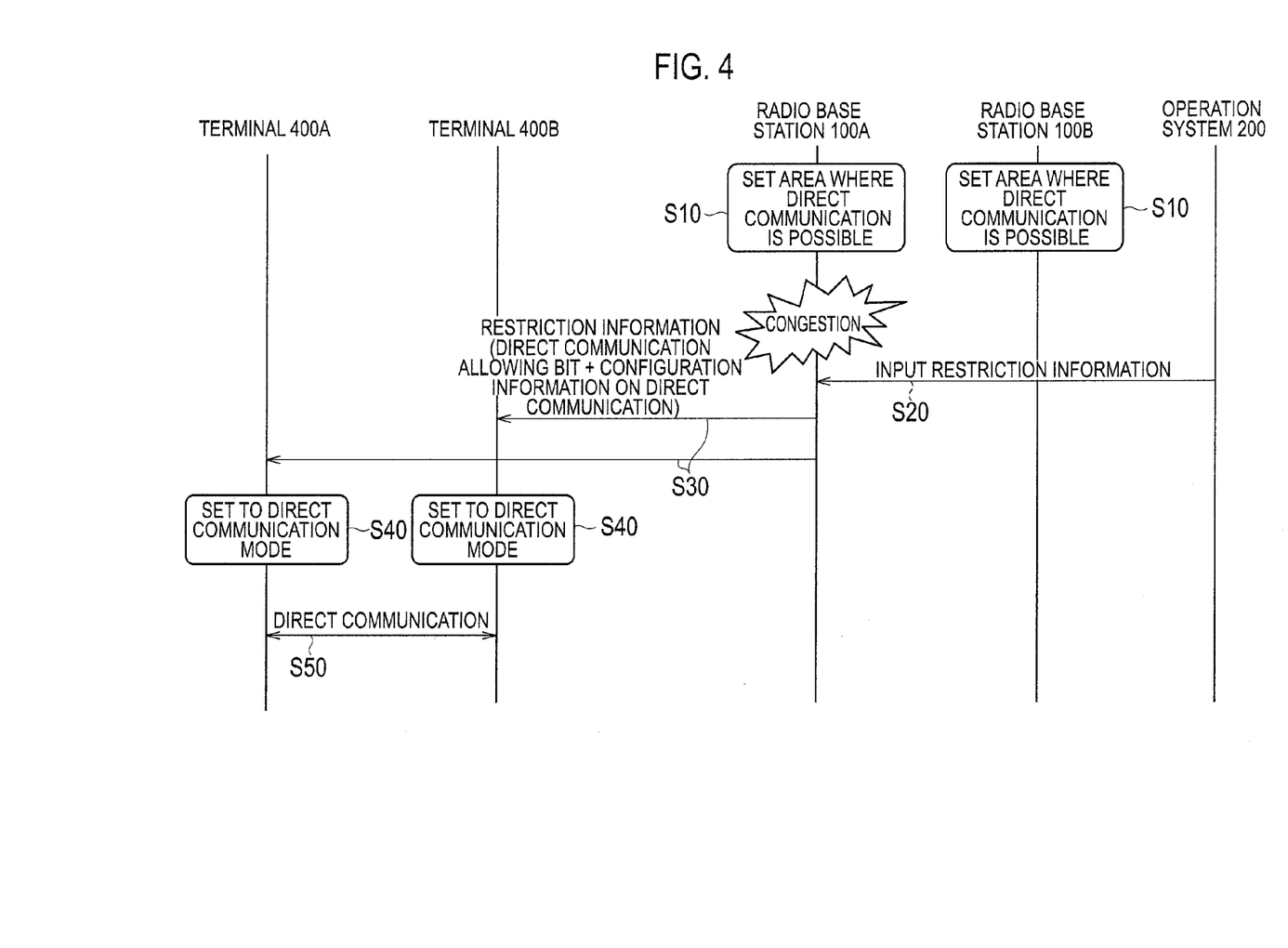
FIG. 4 is a communication sequence in which the terminal 400A performs direct communication with a terminal 400B during access restriction, according to the embodiment of the present invention.

FIG. 4 shows a communication sequence in which the terminal 400A performs direct communication with the terminal 400B during access restriction. As shown in FIG. 4, the radio base stations 100A, 100B each set in advance an area where direct communication is possible (S10). Alternatively, the operation system 200 may dynamically set areas where direct communication is possible. Herein, the radio base station 100A becomes congested.

The operation system 200 inputs restriction information to the radio base station 100A when the radio base station 100A becomes congested (S20). Specifically, the operation system 200 commands the radio base station 100A to restrict accesses from the terminals. Alternatively, the radio base station 100A may autonomously invoke access restriction according to the congestion status.

Based on the access restriction command from the operation system 200, the radio base station 100A broadcasts an access restriction to the terminal 400A and the terminal 400B which are located in its cell (S30). The access restriction contains a direct communication allowing bit for permitting direct communication (permission information) and configuration information on direct communication (such as a frequency band allowed for direct communication, the radio field intensity of radio signals, and originating timing for terminals (timing of executing direct communication)).

Upon receipt of the restriction information, the terminal 400A and the terminal 400B set themselves to direct communication mode (S40), and start direct communication without involving the radio base station 100A, based on the configuration information on direct communication contained in the restriction information (S50).

Note that, as described above, the operation system 200 can send the direct communication allowing bit for permitting direct communication to be performed between adjacent multiple areas, e.g., the cell formed by the radio base station 100A and the cell formed by the radio base station 100B. Specifically, the operation system 200 may send the permission information on direct communication not only to the radio base station 100A being congested, but also to the radio base station 100B so that the terminals 400C and 400D camping on the cell formed by the radio base station 100B can perform direct communication. Such permission of direct communication in an adjacent cell can enhance the possibility for the terminal 400B and the terminal 400C which camp on difference cells to be able to perform direct communication with each other. For example, when the terminal 400B and the terminal 400C camping on difference cells are located at the edges of their respective cells and are close to each other, they can perform direct communication at high speed with low transmission power (low interference).

Further, the terminal 400A and the terminal 400B may retain a list of terminals with which the terminal 400A or 400B can perform direct communication. When originating a call with a terminal on the list, even during access restriction, a message indicating that the communication is possible is displayed, and this call is removed from targets for the access restriction. The list of terminals with which the terminal can perform direct communication can be formed based on, for example, responses to a broadcast signal sent to terminals located in the periphery. The list of terminals with which the terminal can perform direct communication may be notified from the network side by a Device Management (DM) method or the like.

Further, if the terminal 400A and the terminal 400B have acquired the configuration information on direct communication by another method, the terminal 400A and the terminal 400B preferably update it with configuration information broadcasted through the restriction information in order to retain newest configuration information.

(3.2) Operation in Response to Service Reject

Figure 5:
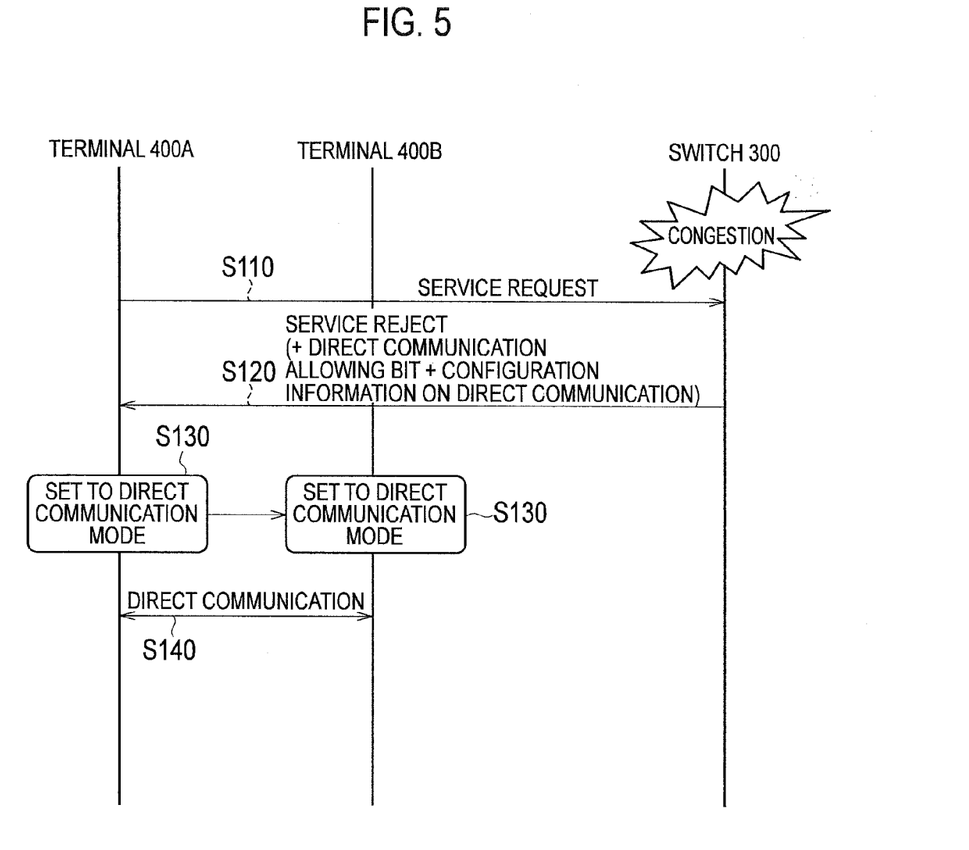
FIG. 5 is a communication sequence in which the terminal 400A performs direct communication with the terminal 400B in response to a Service reject, according to the embodiment of the present invention.

FIG. 5 shows a communication sequence in which the terminal 400A performs direct communication with the terminal 400B in response to a Service reject. As shown in FIG. 5, the switch 300 becomes congested.

With the switch 300 being congested, the terminal 400A sends a communication request, or more specifically a Service request, to communicate with the terminal 400B (S110). Being congested, the switch 300 sends the terminal 400A, via the radio base station 100A (not shown), a Service reject to reject the Service request received (S120). The Service reject contains, as the access restriction described above does, a direct communication allowing bit for permitting direct communication (permission information) and configuration information on direct communication (such as a frequency band allowed for direct communication, the radio field intensity of radio signals, and originating timing for terminals (timing of executing direct communication)). The configuration information may be set by the radio base station 100A instead as follows: when sending the Service reject to the radio base station 100A by an S1-AP signal, the switch 300 adds command information indicating that the radio base station 100A is to set the configuration information on direct communication. Note that a terminal that has received a Service reject cannot originate a call for a certain period of time (e.g., 60 seconds).

Upon receipt of the Service reject, the terminal 400A sets itself to direct communication mode (S130), and requests direct communication by designating the terminal 400B based on the configuration information on direct communication contained in the Service reject, such as, for example, a telephone number, or an IP address. This request also contains the configuration information. Thus, the terminal 400B also sets itself to direct communication mode, and the terminal 400A and the terminal 400B start direct communication without involving the radio base station 100A (S140).

(4) Advantageous Effects

According to the radio communication system 10, the terminal 400A (to 400D, the same applies below) receives a call restriction (an access restriction or a Service reject) containing configuration information on a communication environment necessary for direct communication. Further, during restriction of initiation of communication to the radio access network, the terminal 400A performs direct communication with another terminal based on the configuration information on direct communication if the direct communication determination unit 430 determines that the communication application 410 can be executed through direct communication.

Hence, even if a call request from a terminal cannot be accepted due to congestion on the network side, the possibility of providing a communication application can be enhanced by use of inter-terminal direct communication (D2D communication). Further, the enhancement of the possibility of providing direct communication during network congestion allows reduction in the amount of traffic going through the radio access network, and therefore may provide a faster solution to the congestion.

In addition, according to this embodiment, direct communication is permitted in an adjacent cell, thereby allowing enhancement in the possibility for terminals camping on different cells to be able to perform direct communication with each other.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, although a call restriction contains permission information indicating whether or not direct communication is permitted (direct communication allowing bit) in the above embodiment of the present invention, the permission information does not necessarily have to be contained in the call restriction. For instance, if the call restriction does not contain the permission information, a terminal may start direct communication autonomously.

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as a radio communication terminal (for example, a terminal 400A) capable of providing a communication application via a radio access network and providing a communication application through direct communication with another radio communication terminal (for example, terminal 400B) without involving the radio access network, the radio communication terminal including: a call restriction reception unit 420 configured to receive an access restriction or a Service reject (a call restriction) restricting initiation of communication to the radio access network; a direct communication determination unit 430 configured to determine whether or not a communication application to be executed in the radio communication terminal is executable through direct communication with another radio communication terminal without involving the radio access network; and a radio communication unit 440 configured to execute direct communication based on a result of the determination by the direct communication determination unit. Here, the call restriction reception unit receives a call restriction containing configuration information on a communication environment necessary for direct communication, and during restriction of initiation of communication to the radio access network, the radio communication unit executes direct communication with the other radio communication terminal based on the configuration information when the direct communication determination unit determines that the communication application is executable through direct communication.

In the first feature of the present invention, the call restriction reception unit may receive the call restriction containing direct communication allowing bit (permission information) indicating whether direct communication is permitted or not, and the direct communication determination unit may determine whether the communication application is executable through direct communication or not based on the permission information.

In the first feature of the present invention, a call restriction control unit 450 may be configured to determine whether the communication application is targeted by the call restriction or not when the direct communication determination unit determines that the communication application is not executable through direct communication, and to permit the communication application to be executed via the radio access network when the communication application is not targeted by the call restriction.

A second feature of the present invention is summarized as an operation system 200 (a communication control apparatus) which controls a radio communication terminal capable of providing a communication application via a radio access network and providing a communication application through direct communication with another radio communication terminal without involving the radio access network, the communication control apparatus including a call restriction transmission unit 220 configured to send the radio communication terminal and the other radio communication terminal a call restriction restricting initiation of communication to the radio access network and containing permission information indicating whether direct communication is permitted or not and configuration information on a communication environment necessary for direct communication. Here, the call restriction transmission unit sends the permission information permitting direct communication between adjacent multiple cells.

A third feature of the present invention is summarized as a communication control method performed by a radio communication terminal capable of providing a communication application via a radio access network and providing a communication application through direct communication with another radio communication terminal without involving the radio access network, the method including the steps of: receiving a call restriction from the radio access network, the call restriction restricting initiation of communication to the radio access network; determining whether or not a communication application to be executed in the radio communication terminal is executable through direct communication with another radio communication terminal without involving the radio access network; and executing direct communication based on a result of the determination made in the determining step. Here, in the receiving step, the call restriction received contains configuration information on a communication environment necessary for direct communication, and in the step of executing direct communication, during restriction of initiation of communication to the radio access network, the direct communication with the other radio communication terminal is executed based on the configuration information if the direct communication determination unit determines that the communication application is executable through direct communication.

Note that the entire content of Japanese Patent Application No. 2012-095080 (filed on Apr. 18, 2012) is incorporated by reference in the present specification.

INDUSTRIAL APPLICABILITY

According to the aspects of the present invention, what can be provided are a radio communication terminal, a communication control apparatus, and a communication control method capable of enhancing the possibility of providing a communication application through inter-terminal direct communication (D2D communication) even in a case where a call request cannot be accepted due to congestion on the network side.

EXPLANATION OF THE REFERENCE NUMERALS 10 radio communication system
100A, 100B radio base station
200 operation system
210 call restriction setting unit
220 call restriction transmission unit
300 switch
400A to 400D terminal
410 communication application
420 call restriction reception unit
430 direct communication determination unit
440 radio communication unit
450 call restriction control unit

The invention claimed is:
1. A radio communication terminal capable of providing a communication application via a radio access network and providing a communication application through direct communication with another radio communication terminal without involving the radio access network, the radio communication terminal comprising:

a call restriction reception unit configured to receive a call restriction from the radio access network, the call restriction restricting initiation of communication to the radio access network;

a direct communication determination unit configured to determine whether or not a communication application to be executed in the radio communication terminal is executable through direct communication with another radio communication terminal without involving the radio access network; and a radio communication unit configured to execute direct communication based on a result of the determination by the direct communication determination unit, wherein:

the call restriction reception unit receives a call restriction containing configuration information on a communication environment necessary for direct communication, during restriction of initiation of communication to the radio access network, the radio communication unit executes direct communication with the other radio communication terminal based on the configuration information when the direct communication determination unit determines that the communication application is executable through direct communication, the call restriction reception unit receives the call restriction containing permission information indicating whether direct communication is permitted or not, and the direct communication determination unit determines whether the communication application is executable through direct communication or not based on the permission information.

2. A radio communication terminal capable of providing a communication application via a radio access network and providing a communication application through direct communication with another radio communication terminal without involving the radio access network, the radio communication terminal comprising:

a call restriction reception unit configured to receive a call restriction from the radio access network, the call restriction restricting initiation of communication to the radio access network;

a direct communication determination unit configured to determine whether or not a communication application to be executed in the radio communication terminal is executable through direct communication with another radio communication terminal without involving the radio access network;

a radio communication unit configured to execute direct communication based on a result of the determination by the direct communication determination unit, and a call restriction control unit configured to determine whether the communication application is targeted by the call restriction or not when the direct communication determination unit determines that the communication application is not executable through direct communication, and permit the communication application to be executed via the radio access network when the communication application is not targeted by the call restriction, wherein:

the call restriction reception unit receives a call restriction containing configuration information on a communication environment necessary for direct communication, and during restriction of initiation of communication to the radio access network, the radio communication unit executes direct communication with the other radio communication terminal based on the configuration information when the direct communication determination unit determines that the communication application is executable through direct communication.

3. A communication control method performed by a radio communication terminal capable of providing a communication application via a radio access network and providing a communication application through direct communication with another radio communication terminal without involving the radio access network, the method comprising the steps of:

receiving a call restriction from the radio access network, the call restriction restricting initiation of communication to the radio access network;

determining whether or not a communication application to be executed in the radio communication terminal is executable through direct communication with another radio communication terminal without involving the radio access network; and executing direct communication based on a result of the determination made in the determining step, wherein:

in the receiving step, the call restriction received contains configuration information on a communication environment necessary for direct communication, and in the step of executing direct communication, during restriction of initiation of communication to the radio access network, the direct communication with the other radio communication terminal is executed based on the configuration information if the determining step determines that the communication application is executable through direct communication, in the receiving step, the radio communication terminal receives the call restriction containing permission information indicating whether direct communication is permitted or not, and in the determining step, the radio communication terminal determines whether the communication application is executable through direct communication or not based on the permission information.

4. A communication control method performed by a radio communication terminal capable of providing a communication application via a radio access network and providing a communication application through direct communication with another radio communication terminal without involving the radio access network, the method comprising the steps of:

receiving a call restriction from the radio access network, the call restriction restricting initiation of communication to the radio access network;

determining whether or not a communication application to be executed in the radio communication terminal is executable through direct communication with another radio communication terminal without involving the radio access network;

executing direct communication based on a result of the determination made in the determining step, and determining whether the communication application is targeted by the call restriction or not when the communication application is not executable through direct communication in the determining step, and permit the communication application to be executed via the radio access network when the communication application is not targeted by the call restriction, wherein:
in the receiving step, the call restriction received contains configuration information on a communication environment necessary for direct communication, and
in the step of executing direct communication, during restriction of initiation of communication to the radio access network, the direct communication with the other radio communication terminal is executed based on the configuration information if the determining step determines that the communication application is executable through direct communication.

* * * * *